UNITED STATES PATENT OFFICE.

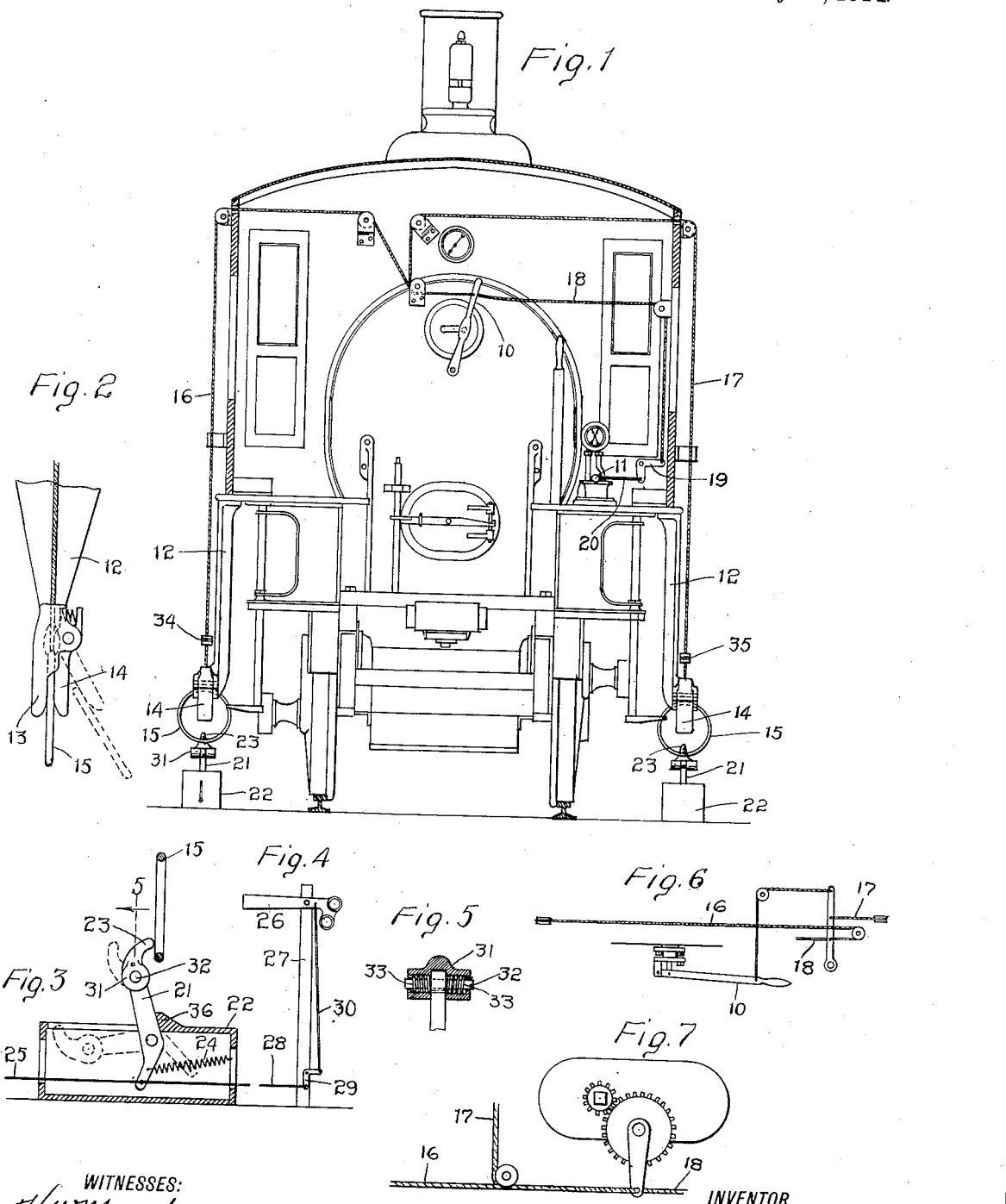

GEORG KOCH, OF SHELTON, CONNECTICUT.

SPEED-REDUCING AND STOPPING MECHANISM.

1,098,041.  Specification of Letters Patent.  Patented May 26, 1914.

Application filed October 14, 1913. Serial No. 795,149.

*To all whom it may concern:*

Be it known that I, GEORG KOCH, a subject of the Emperor of Germany, residing at Shelton, county of Fairfield, State of Connecticut, have invented an Improvement in Speed-Reducing and Stopping Mechanism, of which the following is a specification.

This invention has for its object to provide simple and easily operated speed reducing and stopping mechanism for locomotives adapted to be operated by hand or power from a signal tower or any convenient station without the volition of the engineer, leaving, however, the further control of the locomotive entirely in the hands of the engineer. With these and other objects in view I have devised the novel mechanism which I will now describe, referring to the accompanying drawing forming a part of this specification and using reference characters to indicate the several parts.

Figure 1 is a view in elevation of the interior of a locomotive cab looking toward the front; Fig. 2 a detail view on an enlarged scale, as seen from the left in Fig. 1, illustrating means on the locomotive adapted for engagement by means independent of the locomotive for reducing speed or stopping the locomotive; Fig. 3 a detail view partly in section and partly in elevation, illustrating means subject to control from a signal tower or station and adapted to engage the coöperating mechanism of the locomotive; Fig. 4 a view on a reduced scale illustrating a simple form of signal which may or may not be used in connection with the station controlled mechanism; Fig. 5 a detail sectional view on the line indicated by 5 in Fig. 3, looking in the direction of the arrow; Fig. 6 a detail plan view illustrating a variant form of the mechanism carried by the locomotive adapted for use in connection with a throttle lever swinging in a plane longitudinal to the cab; and Fig. 7 is a detail plan view showing the invention applied to the controller of an electric locomotive or motor instead of to the throttle lever of a steam locomotive.

10 denotes the throttle lever and 11 the air brake lever of a locomotive which are the only parts that coöperate with the present invention, any special construction of locomotive or arrangement and location of the throttle lever and air brake lever being wholly immaterial so far as the principle of the invention is concerned. Upon each side of the locomotive is a bracket 12 each carrying a fixed jaw 13 and a spring-controlled jaw 14.

15 denotes rings which are normally held between the jaws and 16 and 17 flexible connections, as wire ropes or chains secured to the rings and extending upward through suitable guides and over pulleys to the throttle lever from which another flexible connection 18 extends over a pulley or pulleys to the air brake lever. I have shown connection 18 as attached to a bell crank lever 19 from which a connection 20 extends to the air brake lever. The rings are normally retained by the jaws in the position shown in Fig. 1 and in full lines in Fig. 2, that is, in position to be engaged by means upon the road bed which is adapted to be operated from any convenient place. I have shown the coöperating means on the road bed as consisting of a lever 21, (one on each side of the road bed) pivoted in a suitable box 22 and carrying a spring-controlled hook 23 which is adapted when the lever is thrown upward, as in Fig. 3, to engage the corresponding ring carried by the locomotive. A spring 24 in the box normally holds the lever and hook drawn downward within the box, as in dotted lines in Fig. 3. A flexible connection 25 extends from the lever to a signal tower or other operating station.

26 denotes a signal upon a pole 27, which may or may not be used in connection with the stopping mechanism. A connection 28 is shown as extending from the lever to a bell crank lever 29 on the pole from whence another connection 30 extends to the signal. The hook is shown as provided with a head 31 through which and through the lever a pivot 32 extends.

33 denotes springs socketed in the head, their ends being attached respectively to the lever and to the head, which act to retain the hook in engaging position.

Connection 16 is provided with a stop 34 and connection 17 with a stop 35 either of which is adapted to engage the corresponding fixed jaw, or any convenient fixed part. Stop 34 is so adjusted on connection 16 as to permit the connection to be pulled far enough to swing the throttle lever to its closing position and to swing the air brake lever to its emergency position, and stop 35 is so adjusted on connection 17 as to permit the connection to swing the throttle lever to a partly closing position only and to swing the air brake lever to the service position.

Fig. 6 shows a different arrangement of connections adapted to a throttle lever swinging in a plane longitudinal to the cab instead of in a plane transverse thereto, and Fig. 7 shows the adaptation of the invention to the controller of an electric locomotive or motor.

The operation is obvious from the description already given. The jaws normally retain the rings in operative position. It will be understood of course that there is an independent connection 25 leading to a lever 21 on each side of the road bed. Should it be required to stop a train or reduce its speed the operator at a signal tower or any convenient place operates the proper connection 25. If it is simply required to reduce speed the connection 25 corresponding with connection 17 on the locomotive is operated. If it is required to stop the locomotive the connection 25 corresponding with connection 16 on the locomotive is operated. When a connection 25 is operated the corresponding lever 21 is thrown to the full line position in Fig. 3 against the power of spring 24. The power of the spring or springs in the hook is strong enough to retain the hook in its operative position and to operate both the throttle lever and the air brake lever until the fixed jaw is engaged by the stop on the corresponding throttle lever and air brake connection. The power of the spring-controlled hook and spring-controlled jaw will then be overcome, the spring-controlled jaw will be swung outward by the ring, as indicated by dotted lines in Fig. 2, and the hook will yield, as indicated by dotted lines in Fig. 3, and permit the ring to slide off therefrom. The instant the pull upon connection 25 is relieved, spring 24 will swing the lever and hook to their normal position within the box, as indicated by dotted lines in Fig. 3. A stop 36 is provided on the box to limit the upward swing of the lever.

Having thus described my invention I claim:

1. The combination with the throttle lever and air brake lever of a locomotive, of rings adapted for engagement by means upon a road bed, fixed and spring-controlled jaws by which the rings are normally held, brackets by which the jaws are carried and connections intermediate said rings and the throttle and air brake levers.

2. The combination with the throttle lever and air brake lever of a locomotive, of rings adapted for engagement by means upon a road bed, fixed and spring-controlled jaws by which the rings are normally held, connections intermediate said rings and the throttle and air brake levers and stops on the connections for limiting the movement of the connections when the rings are engaged by the means upon a road bed.

3. The combination with the throttle lever and air brake lever of a locomotive, of rings on opposite sides of the locomotive adapted for engagement by means upon a road bed, fixed and spring-controlled jaws by which the rings are normally held, connections from said rings to the throttle and air brake levers and stops on said connections adapted to engage the fixed jaws, one of said stops being adjusted to permit the corresponding connection to swing the throttle lever to its closing position and the air brake lever to its emergency position, and the other stop being adjusted to permit the corresponding connection to swing the throttle lever to a partly closing position and the air brake lever to the service position.

4. The combination with the throttle and air brake levers of a locomotive, of rings on opposite sides of the locomotive adapted for engagement with means upon a road bed, connections from said rings to said levers and means for causing one connection to swing the throttle lever to its closing position and the air brake lever to its emergency position and means for causing the other connection to swing the throttle lever to a partly closing position and the air brake lever to the service position.

5. The combination with the throttle and air brake levers of a locomotive, of a ring suspended at the side of the locomotive, a connection from said ring to said levers, fixed and spring-controlled jaws by which the ring is normally held, a stop adapted to engage the fixed jaw to limit the movement of the connection, for the purpose set forth, and station controlled means adapted to engage the ring and to release it when the stop engages the fixed jaw.

6. The combination with the throttle and air brake levers of a locomotive, of a ring suspended at the side of the locomotive, a connection from said ring to said levers, means for normally holding the ring, a stop adapted to limit the movement of the connection, for the purpose set forth, and station controlled means adapted to engage the ring and to release it subject to the control of the stop.

7. The combination with the throttle lever and air brake lever of a locomotive, of rings adapted for engagement by means upon a road bed, jaws by which the rings are normally held, brackets by which the jaws are carried and connections intermediate said rings and the throttle and air brake levers.

8. The combination with the throttle and air brake levers of a locomotive, of rings suspended from the sides of the locomotive, connections from said rings to said levers and station controlled means for engaging and disengaging said rings.

In testimony whereof I affix my signature in presence of two witnesses.

GEORG KOCH.

Witnesses:
M. HOURTE,
GOTTFRIED KOCH.